3,239,290
DRAWN RACE BEARING OF SUPERIOR ROUND-
NESS AND DIMENSIONAL CHARACTERISTICS
Carl F. Benson and James P. Torrant, Torrington, Conn.,
assignors to The Torrington Company, Torrington,
Conn., a corporation of Maine
Filed Dec. 24, 1963, Ser. No. 333,153
3 Claims. (Cl. 308—207)

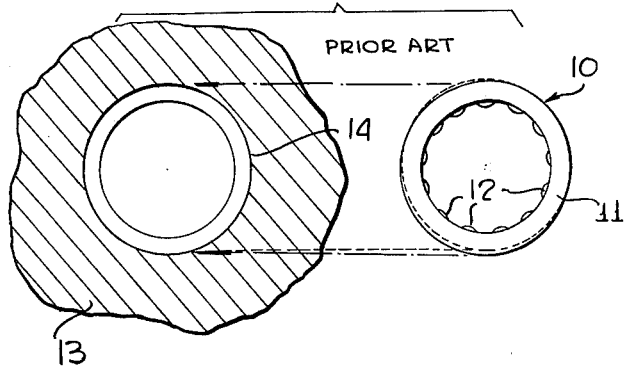
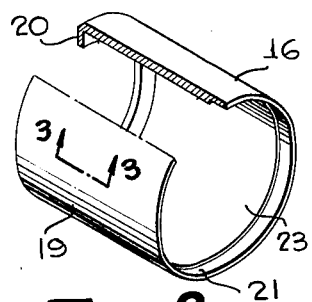
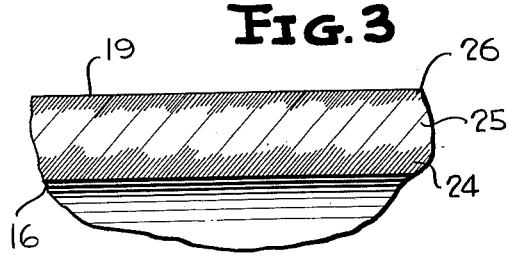
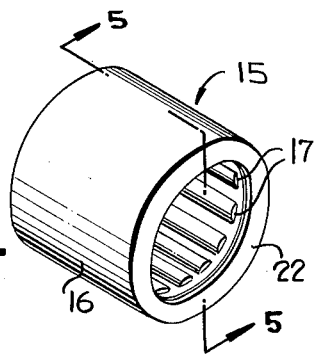
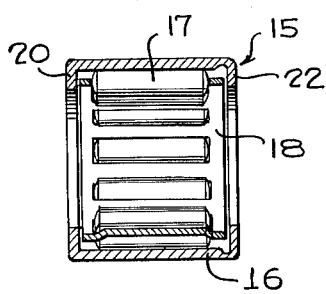
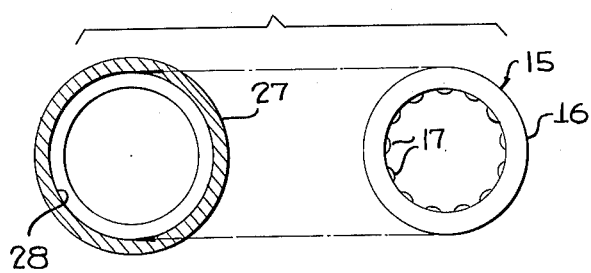
INVENTORS
CARL F. BENSON
& JAMES P. TORRANT United States Patent Office 3,239,290
Patented Mar. 8, 1966

This invention relates in general to new and useful improvements in anti-friction bearings, and more particularly to a novel drawn race bearing of superior roundness and dimensional characteristics.

The customary type of roller bearing is formed of an outer race adapted to be placed within a housing and a plurality of rollers mounted within the race and bearing against the inner surface thereof. The rollers normally directly engage a hardened shaft which functions as the inner race for the rollers. The bearings may be of the full complement type wherein the rollers are in touching contact with one another or may be of the type wherein the rollers are retained in spaced relation by a cage or retainer.

An outer race of a roller bearing is purposely made thin both for the purpose of saving space and for convenience of manufacture. Such a bearing race is most economically formed by a deep drawing operation from sheet metal. Although drawn sheet metal bearing races, when initially formed, are true, during the hardening of the surfaces thereof, which includes carburizing and heat treatment, the bearing race becomes distorted so that it is no longer of the desired right cylinder configuration. As a result, it is necessary that a heavy housing be provided for use with roller bearings of the type having thin walled races. The housings are provided with bores therein of a size to receive the bearing races with a pressed fit. When the distorted bearing races are pressed into the bores within housings, the housing rounds and straightens the bearing shells back to their right cylinder configurations. While such an arrangement has proved to be satisfactory in the past, there are many instances where it is desirable to utilize roller bearings but wherein it is either undesirable or not economically feasible to utilize heavy housings. This is particularly true wherein it is desired to utilize roller bearings in low strength metal housings, such as aluminum housings, or within split housings which will not effect the necessary truing and rounding of conventional light metal bearing races.

In view of the foregoing, it is the primary object of this invention to provide a novel roller bearing having a thin bearing race, and the bearing race having a hardened inner surface against which rollers bear with the bearing race distinguishable over prior bearing races in that in an unsupported state the bearing race surface is true and round, whereby the bearing race does not rely upon a housing for retaining the shape thereof.

Another object of this invention is to provide a novel drawn sheet metal bearing race for roller bearings, the bearing race having been treated to have a hardened inner roller engaging surface, and the metal of the bearing race surrounding the hardened inner surface being unchanged during the hardening of the inner surface of the bearing race and serving to support the inner surface of the bearing race in a round and true state.

Still another object of this invention is to provide a novel thin bearing race for rollers wherein the inner surface of the bearing race is hardened as compared to the surrounding metal of the bearing race, and the metal surrounding the hardened inner surface of the bearing race serving to support the hardened inner surface in a round and true state independently of any support for the bearing race.

A further object of this invention is to provide a novel thin walled drawn sheet metal bearing race for rollers wherein the bearing race has a carburized inner surface which normally becomes distorted during the carburizing process, the bearing race being distinguishable from similar bearing races in that in an unsupported state of the bearing race, the inner roller engaging surface is round and true.

A further object of this invention is to provide a novel drawn sheet metal bearing race of the type utilized as an outer race of a roller bearing, and wherein the inner surface of the bearing race which defines the roller engaging surface thereof has been hardened through a carburization process during which the roller engaging surface is distorted, the bearing race having the inner surface thereof trued so as to be round and true, and the trued roller engaging surface being retained in its round and true state by a conditioning of the metal surrounding the inner surface.

Another object of this invention is to provide a thin sheet metal bearing race which in cross section exhibits a carburized inner surface layer with the metal disposed outwardly thereof being in its natural unhardened state, and the extreme outer surface layer of the bearing race showing a mild hardening resulting from the working thereof.

A still further object of this invention is to provide a roller bearing of the type which includes a drawn sheet metal bearing race wherein the bearing race is round and true in its unsupported state and wherein the bearing may be readily mounted in a housing wherein the fit of the bearing within the housing is not required for the straightening of the bearing race as in the case of like bearings heretofore.

With the above and other objects in view that will hereinafter appear, the nature of the invention will be more clearly understood by reference to the following detailed description, the appended claims and the several views illustrated in the accompanying drawings:

In the drawings:

FIGURE 1 is a schematic view of a housing and an associated bearing prior to the assembly of the bearing within the housing and showing how in the past it has been necessary for the housing to be relatively heavy whereby sufficient pressures may be exerted upon the bearing race during the insertion of the bearing into the housing to round and straighten the bearing race from its original distorted shape.

FIGURE 2 is a perspective view of a bearing shell formed in accordance with this invention with an intermediate portion thereof cut away and shown in section.

FIGURE 3 is an enlarged fragmentary sectional view taken along the line 3—3 of FIGURE 2 and shows schematically the metallurgical construction of the bearing race.

FIGURE 4 is a perspective view of a bearing formed in accordance with this invention.

FIGURE 5 is a vertical sectional view taken through the bearing of FIGURE 4 and shows the specific details thereof.

FIGURE 6 is a schematic view similar to FIGURE 1 and shows the fact that the bearing race, in its unsupported state, is round and true and may be readily received within a bore in a lightweight housing.

Referring now to the drawing in detail, it will be seen that there is illustrated in FIGURE 1 a roller bearing of the customary type now in use. The roller bearing is generally referred to by the numeral 10 and is provided with a thin metal race 11 in which there is positioned a plurality of rollers 12. The rollers 12 are illustrated as being disposed in spaced relation and are retained within the bearing race 11 in a customary manner by means of a retainer or cage which is not shown. However, the bearing 10 may equally as well be of the fully complement type wherein the individual rollers are in side by side touching relation.

The bearing 10, since it is of the conventional presently available type, has the bearing race thereof formed of thin material which is preferably drawn from sheet metal. When the inner surface of the bearing race 11 is heat treated so that it may properly function as an outer rolling surface for the rollers 12, the bearing race 11 becomes distorted and out of round. As a result, in its unsupported state shown in FIGURE 1, the bearing 10 is not satisfactory for use, but must be worked upon to return the bearing race 11 to a round and true condition.

At the present time a relatively heavy housing such as the housing 13 of FIGURE 1 having great strength is required for receiving the bearing 10. The housing 13 is provided with a bore 14 in which the bearing 10 is to be received. The bore 14 is of a size wherein the bearing 10 must be pressed thereinto. When the bearing 10 is pressed into the bore 14 of the housing 13, the pressures exerted by the walls of the bore 14 on the bearing race 11 serve to automatically round and straighten the bearing race 11 and retain the same in a round and true condition. However, unless the housing 13 is constructed so as to have sufficient strength, when the bearing 10 is pressed thereinto, the housing 13 will distort. Accordingly, at the present time roller bearings having thin metal bearing races are suitable for use with housings only of relatively high strength.

In view of the foregoing, it will be readily apparent that the present use of roller bearings having thin metal bearing races is undesirably restricted. There are many instances where roller bearings could be advantageously utilized, but the strength of the supporting housing is insufficient to receive the bearing wherein a pressed fit is necessary for the rounding and straightening of the bearing race. Also, there are many instances where the housing is relatively light and split so that the necessary conditions for rounding the bearing shell cannot be obtained. To this end there has been provided the bearing which is the subject of this invention, the bearing being shown in FIGURE 4 and being generally referred to by the numeral 15. The bearing 15 differs from the bearing 10 in that while it is provided with a bearing race 16 formed of the same material as the bearing race 11, the bearing race 16 in its unsupported state is round and true. Therefore, the bearing 15 does not require a pressed fit in a housing to effect the restoring of the bearing to a round and true condition. As is clearly shown in FIGURE 5, the bearing 15 also includes a plurality of rollers 17 which are illustrated as being retained in axis-parallel relation by means of a retainer or cage 18. At this time it is pointed out that the bearing may be of the full complement type wherein the rollers 17 are retained in place by the bearing race and are in side-by-side contacting relation.

The bearing race 16 differs from the bearing shell 11 in the specific metallurgical formation of a cylindrical body portion 19 hereof. At this time it is pointed out that the bearing race 16, when originally formed, includes the cylindrical body portion 19 and a terminal flange 20 which is inwardly directed. At the opposite end of the body portion 19 there is an end portion 21 of a reduced thickness particularly adapted to be turned inwardly after the rollers 17, together with the retainer 18, are assembled within the race to define a second flange 22. The bearing race 16 is preferably of a drawn sheet metal construction although it is feasible to machine the bearing race from tubular stock. It is to be understood, however, that the bearing race 16 is thin as compared to the normal thickness of conventional bearing races.

Bearing races, such as the bearing races 11 and 16, when initially formed, are round and true. However, in order to harden at least the inner surface thereof to define a suitable roller engaging surface 23, the bearing races are subjected to a surface hardening operation which requires heat. The heat of the surface hardening operation is such that the bearing races having hardened roller engaging surfaces are distorted from their original right cylinder configurations. A typical surface hardening operation is a carburizing and quenching operation which requires high temperatures.

During the hardening of the roller engaging inner surface of a bearing race, such as the bearing race 11, it is also customary to harden the outer surface thereof. However, in accordance with this invention, only the inner surface of the body 19 of the bearing race 16 is hardened. After the hardening operation is completed, the then distorted bearing race 16 is trued, preferably by placing the same on a mandrel, and then so working the unaffected metal of the body 19 surrounding the hardened inner surface 22 to retain the roller engaging inner surface 22 in a round and true state.

Referring now to FIGURE 3 in particular, it will be seen that a cross section through the body 19 of the bearing race 16 shows a hardened inner surface layer 24 which has disposed outwardly thereof unaffected metal 25 which serves to retain the configuration of the hardened inner surface layer 24. The body 19 of the bearing race 16 may also show a very thin outer layer 26 which has been work hardened. The work hardened layer 26 results from the re-shaping of the metal surrounding the hardened inner layer 24 to retain the hardened inner layer 24 in a round and true shape after the repositioning thereof.

Referring now to FIGURE 6 in particular, it will be seen that as compared to the bearing 10, the bearing 15 is round and true and the bearing race 16 is of a right cylinder configuration. Due to the fact that the bearing 15, in its unsupported state is round and true, it is not necessary that the bearing 15 be forced into a housing under sufficient pressure to effect the rounding and straightening thereof. Therefore, as opposed to the housing 13, a relatively light weight and low strength housing 27 may be utilized for supporting the bearing 15. The housing 27, like the housing 13, is provided with a bore 28 for receiving the bearing 15. However, the relative diameters of the bearing 15 and the bore 28 is such that the bearing 15 may be lightly pressed into the bore 28 and the frictional fit between the bearing 15 and the housing 27 need be only sufficient to prevent relative rotation between the bearing race 16 and the housing 27.

It will also be readily apparent that inasmuch as the housing need not perform a rounding and straightening operation upon the bearing race 16, the bearing 15 may be utilized in split housings including connecting rods and the like.

Although only a preferred embodiment of the invention has been specifically illustrated and described, it is to be understood that minor variations may be made in the bearing construction within the spirit and scope of the invention, as defined by the appended claims.

What is claimed as new:

1. A drawn sheet metal thin section roller bearing race particularly adapted for mounting in low strength housings, said bearing race comprising a cylindrical body, said body having a heat treated hardened inner surface layer, said inner surface layer presenting an exposed hardened surface particularly adapted for engagement by rollers and having a distorting effect on said body, relatively soft metal surrounding said heat treated hardened inner surface layer and resisting the body distorting effects of said heat treated hardened inner surface layer, and a slightly work hardened outer surface layer cooperating with said relatively soft metal to counteract the body distorting effects of said heat treated hardened inner surface layer and to maintain said heat treated hardened inner surface layer round and true in the unsupported state of said bearing race.

2. The bearing race of claim 1 wherein said heat treated hardened inner surface layer is relatively thin as compared to the wall thickness of said body.

3. The bearing race of claim 1 wherein said heat treated hardened inner surface layer is relatively thin as compared to the wall thickness of said body and the thickness of said heat treated hardened inner surface layer is at least as great as the thickness of said work hardened outer surface layer.

References Cited by the Examiner
UNITED STATES PATENTS

| | | | |
|---|---|---|---|
| 1,885,914 | 11/1932 | Heim | 29—148.4 |
| 2,038,474 | 4/1936 | Brown | 308—212 |
| 2,067,714 | 1/1937 | Kylen | 308—210 |
| 2,069,569 | 2/1937 | Young | 308—212 |
| 2,259,324 | 10/1941 | Robinson | 308—213 |
| 2,291,600 | 8/1942 | Atkinson | 308—208 |
| 2,567,242 | 9/1951 | Smith | 308—213 |
| 2,818,313 | 12/1957 | Gales | 308—212 |
| 2,915,346 | 12/1959 | Stallman | 308—210 |

DON A. WAITE, *Primary Examiner.*

FRANK R. SUSKO, *Examiner.*